Oct. 1, 1940.  C. B. MOORE  2,216,248

PEN FOR RECORDERS

Filed Feb. 1, 1938

*INVENTOR.*
COLEMAN B. MOORE
BY
*ATTORNEY*

Patented Oct. 1, 1940

2,216,248

UNITED STATES PATENT OFFICE 2,216,248

PEN FOR RECORDERS

Coleman B. Moore, Carroll Park, Pa., assignor to The Brown Instrument Company, Philadelphia, Pa., a corporation of Pennsylvania Application February 1, 1938, Serial No. 188,032

4 Claims. (Cl. 120—43)

This invention relates to fountain pens for recorders.

Recording instruments such as circular chart recorders for pressure, temperature, and other quantities employ, usually, a pen arm pivoted adjacent the edge of a chart carrying a pen at its extremity which marks the position of the pen arm upon the chart. Such pens must be of the fountain type and of considerable capacity in order that the service of filling them be reduced to a minimum. In addition, such pens must be of a construction such that they can be readily filled when necessary. Such pens must also provide a continuous flow of ink for a long period of time.

As is well known, when an ordinary pen used in handwriting is initially put into operation, difficulty is ordinarily experienced in starting the flow of ink over the surface of the pen immediately adjacent the writing point, at least unless the pen is first put into the mouth or one effectively wets the said pen surface in some other manner. Similar difficulties are commonly experienced in starting ordinary recording instrument pens into operation.

This objection, along with others, is overcome in the present invention by the use of a pair of concentric capillary tubes, one of which acts as a stylus and the other of which serves to feed ink to the first. By simply moving one of the tubes axially relative to the other a pumping action is set up that tends to feed the ink to the stylus. The flow of ink will then continue evenly until the entire capacity of a reservoir to which the stylus leads is exhausted.

Specific objects of the present invention are to make a fountain pen for recording instruments that is reliable in use, easy and inexpensive to manufacture, which will make a smooth ink line and is easy to keep clean.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 1:
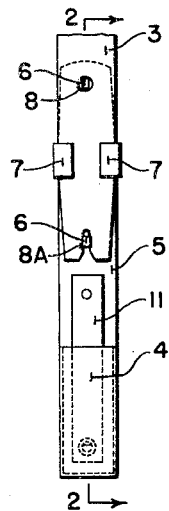
Fig. 1 is a front view of my novel pen and its supporting arm.
Figure 2:
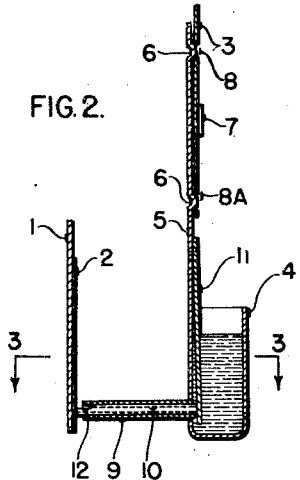
Fig. 2 is a view taken on line 2—2 of Fig. 1.

Referring to the drawing, the reference numeral 1 indicates the usual backing plate for a chart 2 that is used in a recording instrument. The position of an arm 3 over the surface of such a chart is used to indicate the value of the condition being measured and is moved thereacross in accordance with variations in the condition being measured. In order to provide a record of the changes of the value of the condition being measured, it is usual to attach a pen to the end of arm 3 to make a mark on chart 2. A description of the novel type of pen that I have invented will now be given:

In the pen there is a reservoir 4 of suitable shape that has one side 5 extending upwardly as shown. This side is provided with two circular embossings 6 and a pair of ears 7 that serve to hold it in position on arm 3. In order to place the pen on arm 3 it is necessary to slightly bend the extension 5 away from the ears 7 and slip the ears up over the arm. When the pen is correctly positioned, the embossings 6 will lie respectively in opening 8 and slot 8A provided on the arm and will thus be securely held in place. The opening 8 serves to prevent longitudinal movement of the pen and slot 8A serves to prevent sidewise movement thereof.

Attached to the lower end of reservoir 4 and extending therefrom toward the chart 2 is a capillary tube 9 that receives within its bore a second and smaller capillary tube 10 that is slightly longer than tube 9 and preferably closed at its inner end. This second tube 10 serves as a stylus and is kept in its extended position beyond tube 9 by engagement between its inner end and a small leaf spring 11 that is fastened in some manner, such as soldering, to the extension 9.

A flow of ink from the reservoir 4 to the chart 2 is procured by the capillary action of the ink between the two capillary tubes 9 and 10. In order to obtain a flow of ink from the outer end of tube 9 to the tip of stylus 10, that tube is cut back as indicated at 12 so that the bore thereof is open to the ink flowing between the tubes, and directs that ink forward to the chart. The spring 11 serves only the function of resiliently pressing the stylus 10 forward in tube 9, and in order to promote free flow of the ink between stylus 10 and tube 9, the inner end of the latter is cut back as shown at 13. In this manner the space between the stylus and tube 9 is at all times open to the ink in reservoir 4. The arm 3 normally presses the pen against the chart with sufficient force to cause it to draw a line thereon, so it is obvious that spring 11 must exert a larger force in order to keep the tip of the stylus projecting beyond tube 9.

Figure 3:
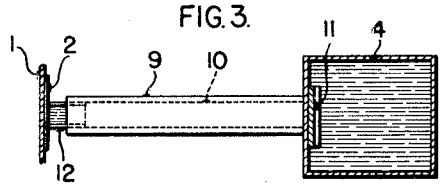
Fig. 3 is an enlarged view taken on line 3—3 of Fig. 2.
Figure 4:
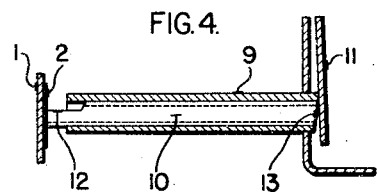
Fig. 4 is an enlarged view of the writing point.
Figure 5:
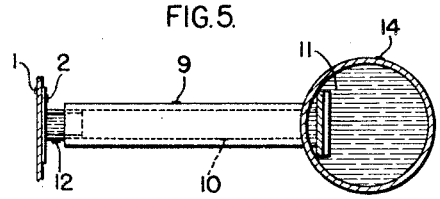
Fig. 5 is a view similar to Fig. 3 showing a different shaped reservoir.

The reservoir 4 is shown as being square in Fig. 3, but it may also be round as shown at 14 in Fig. 5. These two shapes are shown merely as examples and are not to be taken as limiting in any manner.

Some instruments are used to record simultaneously the values of more than one condition, such as temperature and flow, or wet and dry temperature on a single chart. My pen is particularly adapted to be used in such instruments. As is well known, in such instruments one pen is adapted to overlie the other in front of the chart. When my pen is used on a multiple instrument the length of the tube 10 and stylus 9 will be varied so that one pen may overlie another.

Because of the fact that the stylus 10 is itself a small capillary tube, any wear on the tip thereof will not in any way affect the width of the line that is being drawn on the chart. The movement of the pen across the chart will also tend to produce a small relative movement between the stylus 10 and tube 9, thus preventing any tendency of drying of the ink and producing a smooth free flow thereof. If by any chance the ink should dry after the instrument has been out of use for a time, the flow may again be started by merely pressing the pen against the chart to move stylus 9 axially in tube 10 against the tension of spring 11. This will produce a pumping action that will at the same time dispose of any dried ink between the two and force fresh ink toward the stylus tip.

Figure 6:
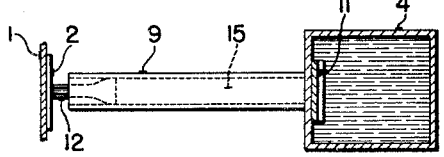
Fig. 6 is a view showing a modified type of stylus.

The width of a line drawn with this type of pen is equal to the outside diameter of the tube being used as a stylus. As it may be desirable in some instances to change the width of the record line, I have provided a stylus of the type shown in Fig. 6. To this end, the tube 15 being used as a stylus has its tip drawn out to a smaller diameter than that shown in the other figures. By inserting into the tube 9 tubes having various diameters at their ends, my pen can be used to draw a line of almost any desired width.

Figure 7:
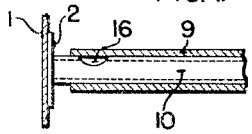
Fig. 7 is a view showing another type of stylus.

There is disclosed in Fig. 7 an alternate method of obtaining a flow of ink from between the tube 9 and stylus 10 to the tip of the stylus. In this form of the invention, a notch 16 is cut in the tube of which the stylus is formed, back of the end of tube 9. Since this notch extends to the bore of the stylus, ink flowing between it and the tube 9 will enter the notch and then flow through the bore of the stylus onto chart 2. This form of stylus has the advantage that the ink is not exposed to the atmosphere until it is actually on the chart, and thus there is less tendency for the ink to dry before reaching the chart. This type of stylus also has the advantage of drawing the same width of line regardless of the angular position of the stylus in tube 10.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. A fountain pen for recorders comprising a reservoir, a tube extending therefrom, a stylus consisting of a second tube extending from said first tube, said stylus having a cut-back portion at its tip.

2. A pen for recorders comprising a reservoir, a supporting member for said pen having openings therein, an extension on said reservoir having ears adapted to encircle said member, and embossings on said extension adapted to be received in the openings in said member.

3. A pen for recorders comprising a reservoir, a tube extending therefrom, a stylus slidably received in said tube and extending therefrom, and resilient means within said reservoir engaging said tube and stylus to prevent relative axial movement thereof.

4. A fountain pen for recorders comprising a reservoir, a tube extending therefrom, a stylus consisting of a second tube extending from said first tube, said stylus having a notch in its surface communicating with the bore thereof.

COLEMAN B. MOORE.